US009098166B2

(12) United States Patent
Bonura et al.

(10) Patent No.: US 9,098,166 B2
(45) Date of Patent: *Aug. 4, 2015

(54) GRADUATED VISUAL AND MANIPULATIVE TRANSLUCENCY FOR WINDOWS

(71) Applicant: Apple Inc., Cupertino, CA (US)

(72) Inventors: Thomas Bonura, Capitola, CA (US); Kim Silverman, Mountain View, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/288,527

(22) Filed: May 28, 2014

(65) Prior Publication Data

US 2014/0344737 A1    Nov. 20, 2014

Related U.S. Application Data

(63) Continuation of application No. 12/046,171, filed on Mar. 11, 2008, which is a continuation of application No. 10/702,969, filed on Nov. 5, 2003, now Pat. No. 7,343,562, which is a continuation of application No. 09/467,316, filed on Dec. 20, 1999, now Pat. No. 6,670,970.

(51) Int. Cl.
*G06F 15/00* (2006.01)
*G06F 13/00* (2006.01)
(Continued)

(52) U.S. Cl.
CPC ............ *G06F 3/0481* (2013.01); *G06F 3/0484* (2013.01); *G09G 5/14* (2013.01); *G06F 2203/04804* (2013.01); *G09G 2340/10* (2013.01)

(58) Field of Classification Search
CPC ................... G06F 3/0481; G06F 2203/04804; G09G 5/14
USPC ......... 715/768, 592, 851–853, 763–765, 797, 715/803, 771, 790; 345/433, 629
See application file for complete search history.

(56) References Cited

U.S. PATENT DOCUMENTS 4,823,281 A    4/1989  Evangelisti et al.
4,827,253 A    5/1989  Maltz
(Continued)

FOREIGN PATENT DOCUMENTS

EP    0605945 A1    7/1994
EP    1242989 A1    9/2002
(Continued)

OTHER PUBLICATIONS

"U.S. Appl. No. 09/467,316, Advisory Action mailed May 21, 2003", 2 pgs.
(Continued)

*Primary Examiner* — Kevin Nguyen
(74) *Attorney, Agent, or Firm* — Schwegman Lundberg & Woessner, P.A.

(57) ABSTRACT

Methods and systems for providing graphical user interfaces are described. Overlaid, information-bearing windows whose contents remain unchanged for a predetermined period of time become translucent. The translucency can be graduated so that, over time, if the window's contents remain unchanged, the window becomes more translucent. In addition to visual translucency, windows also have a manipulative translucent quality. Upon reaching a certain level of visual translucency, user input in the region of the window is interpreted as an operation on the underlying objects rather than the contents of the overlaying window.

20 Claims, 8 Drawing Sheets

(51) Int. Cl.
*G06F 3/0481* (2013.01)
*G09G 5/14* (2006.01)
*G06F 3/0484* (2013.01)

(56) References Cited

U.S. PATENT DOCUMENTS

| | | | |
|---|---|---|---|
| 5,185,808 A | | 2/1993 | Cok |
| 5,265,202 A | | 11/1993 | Krueger et al. |
| 5,283,560 A | | 2/1994 | Bartlett |
| 5,351,067 A | | 9/1994 | Lumelsky et al. |
| 5,463,728 A | | 10/1995 | Blahut et al. |
| 5,638,501 A | | 6/1997 | Gough et al. |
| 5,651,107 A | | 7/1997 | Frank et al. |
| 5,808,605 A | | 9/1998 | Shieh |
| 5,831,615 A | * | 11/1998 | Drews et al. .............. 715/768 |
| 5,892,511 A | | 4/1999 | Gelsinger et al. |
| 5,949,432 A | | 9/1999 | Gough et al. |
| 6,072,489 A | | 6/2000 | Gough et al. |
| 6,118,427 A | * | 9/2000 | Buxton et al. .............. 345/629 |
| 6,670,970 B1 | | 12/2003 | Bonura et al. |
| 7,343,562 B2 | | 3/2008 | Bonura et al. |
| 7,975,399 B2 | | 7/2011 | Kikinis |
| 8,949,728 B2 | | 2/2015 | Bonura et al. |
| 2008/0155438 A1 | | 6/2008 | Bonura et al. |

FOREIGN PATENT DOCUMENTS

| | | |
|---|---|---|
| HK | 1157924 A | 7/2012 |
| WO | WO-98/37483 A1 | 8/1993 |
| WO | WO-01/46942 A1 | 8/2001 |

OTHER PUBLICATIONS

"U.S. Appl. No. 09/467,316, Final Office Action mailed Mar. 10, 2003", 11 pgs.
"U.S. Appl. No. 09/467,316, Final Office Action mailed Oct. 3, 2002", 9 pgs.
"U.S. Appl. No. 09/467,316, Notice of Allowance mailed Jul. 28, 2003", 7 pgs.
"U.S. Appl. No. 09/467,316, Response filed May 7, 2003 to Final Office Action mailed Mar. 10, 2003", 15 pgs.
"U.S. Appl. No. 09/467,316, Response filed Dec. 31, 2002 to Final Office Action mailed Oct. 3, 2002", 8 pgs.
"U.S. Appl. No. 10/702,969, Non Final Office Action mailed Jun. 20, 2007", 9 pgs.
"U.S. Appl. No. 10/702,969, Notice of Allowance mailed Oct. 18, 2007", 6 pgs.
"U.S. Appl. No. 10/702,969, Preliminary Amendment filed Nov. 5, 2003", 9 pgs.
"U.S. Appl. No. 10/702,969, Response filed Sep. 20, 2007 to Non Final Office Action mailed Jun. 20, 2007", 4 pgs.
"U.S. Appl. No. 12/046,171, Final Office Action mailed Oct. 14, 2011", 9 pgs.
"U.S. Appl. No. 12/046,171, Non Final Office Action mailed Apr. 26, 2011", 8 pgs.
"U.S. Appl. No. 12/046,171, Non Final Office Action mailed Jul. 31, 2013", 11 pgs.
"U.S. Appl. No. 12/046,171, Notice of Allowance mailed Feb. 21, 2014", 10 pgs.
"U.S. Appl. No. 12/046,171, Response filed Jul. 26, 2011 to Non Final Office Action mailed Apr. 26, 2011", 7 pgs.
"U.S. Appl. No. 12/046,171, Response filed Oct. 31, 2013 to Non Final Office Action mailed Jul. 31, 2013", 8 pgs.
"U.S. Appl. No. 12/046,171, Terminal Disclaimer filed Oct. 31, 2013", 3 pgs.
"European Application Serial No. 00982078.8, Office Action mailed May 14, 2012", 7 pgs.
"European Application Serial No. 00982078.8, Response filed Sep. 13, 2012 to Office Action mailed May 14, 2012", 17 pgs.
"European Application Serial No. 10011078.2, Office Action mailed May 24, 2012", 4 pgs.
"European Application Serial No. 10011078.2, Response filed Oct. 4, 2012 to Office Action mailed May 24, 2012", 9 pgs.
"European Application Serial No. 00982078.8, Office Action mailed Jan. 22, 2009", 1 pg.
"European Application Serial No. 00982078.8, Office Action mailed Feb. 4, 2008", 6 pgs.
"European Application Serial No. 00982078.8, Office Action mailed Aug. 12, 2002", 2 pgs.
"European Application Serial No. 00982078.8, Office Action mailed Sep. 3, 2009", 1 pg.
"European Application Serial No. 00982078.8, Office Action mailed Dec. 13, 2007", 6 pgs.
"European Application Serial No. 00982078.8, Response filed Jun. 5, 2008 to Office Action mailed Feb. 4, 2008", 13 pgs.
"European Application Serial No. 10011078.2, Extended European Search Report mailed Apr. 15, 2011", 10 pgs.
"European Application Serial No. 10011078.2, Office Action mailed May 20, 2011", 2 pgs.
"European Application Serial No. 10011078.2, Response filed Nov. 25, 2011 to Office Action mailed May 30, 2011", 12 pgs.
"European Application Serial No. 10011078.2, Summons to Attend Oral Proceedings mailed Dec. 6, 2013", 9 pgs.
"International Application Serial No. PCT/US2000/030158, International Preliminary Examination REport mailed Jul. 22, 2002", 4 pgs.
"International Application Serial No. PCT/US2000/030158, International Search Report mailed Apr. 2, 2001", 2 pgs.
"Reducing desktop clutter in GUI", International Business Machines Corporation: *Research Disclosure*, vol. 411, No. 119, (Jan. 7, 1998).
"Translucent Window Attribute", *IBM Technical Disclosure Bulletin*, vol. 36, No. 6A, (Jun. 1, 1993), 135-136.
"Transparent Window Selection", *IBM Technical Disclosure Bulletin*, vol. 30, No. 11, (Apr. 1988), 268-270.
Anonymous, "Method to Allow Users to Select Transparent Color for Windows", *Research Disclosure*, Kenneth Mason Publications Ltd, (Mar. 1993), 1 pg.
Bier, Eric A, et al., "Toolglass and Magic Lenses: The See-Through Interface", *Computer Graphics Proceedings, Annual Conference Series*, (Aug. 1993), 73-80.
Ishii, Hiroshi, et al., "ClearFace: Translucen Multiuser Interface for TeamWorkStation", *Proceedings of ECSCW-91*, (Sep. 1991), 163-174.
Ishii, Hiroshi, et al., "ClearFace: Translucent Multiuser Interface for TeamWorkStation", *ACM Sigchi Bulletin*, vol. 23, No. 4, (Oct. 1991), 67-68.
"U.S. Appl. No. 12/046,171, Notice of Allowance mailed Aug. 20, 2014", 5 pgs.
"U.S. Appl. No. 12/046,171, PTO Response to Rule 312 Communication mailed Jun. 13, 2014", 2 pgs.
"U.S. Appl. No. 12/046,171, Supplemental Notice of Allowability mailed Jan. 7, 2015", 2 pgs.
"U.S. Appl. No. 12/046,171, Supplemental Notice of Allowability mailed Dec. 12, 2014", 2 pgs.

* cited by examiner

GRADUATED VISUAL AND MANIPULATIVE TRANSLUCENCY FOR WINDOWS

CROSS REFERENCE TO RELATED APPLICATIONS

This application is a Continuation Application of application Ser. No. 10/702,969, filed Nov. 5, 2003, now U.S. Pat. No. 7,343,562, which is in turn a Continuation Application of application Ser. No. 09/467,316, filed Dec. 20, 1999, now U.S. Pat. No. 6,670,970.

BACKGROUND

The present invention relates generally to graphical user interfaces for computer systems. More particularly, the present invention relates to systems and methods for interfacing users with applications which provide for greater flexibility in the operation of both applications and user interfaces, specifically situations involving graphical user interfaces including overlapping windows.

The evolution of the computer industry is unparalleled in its rate of growth and complexity. Personal computers, for example, which began as little more than feeble calculators with limited memory, tape-driven input and monochrome displays are now able to tackle almost any data processing task. While this meteoric increase in power was almost sufficient to satisfy the demand of application designers and end users alike, the corresponding increase in complexity created an ease-of-use problem which the industry was somewhat slower in solving. Thus, designers were faced with a new challenge: to harness this computing power in a form usable by even those with relatively little computer training to smooth the transition of other industries into a computer-based information paradigm.

As a result, in the early to mid-1980's many new I/O philosophies, such as "user friendly", "WYSIWYG" and "menu driven" came to the forefront of the industry. These concepts are particularly applicable to microcomputers, also known as personal computers, which are intended to appeal to a broad audience of computer users, including those who previously feared and mistrusted computers. An important aspect of computers which employ these concepts was, and continues to be, the interface which allows the user to input commands and data and receive results, which is common referred to as a graphical user interface (GUI).

The success of this type of interface is evident from the number of companies which have emulated the desktop environment. Even successful concepts, however, must continually be improved in order to keep pace with the rapid growth in this industry. The advent of multimedia, especially CD-ROM devices, has provided vast quantities of secondary storage which have been used to provide video capabilities, e.g., live animation and video clips, as regular components of application displays. With these and other new resources at their disposal, application designers and users alike, demand additional functionality and greater ease of use from the desktop environment.

To consider the challenges associated with continuing GUI design, consider as an example of a GUI which has evolved over time the Finder™ user interface and information management system (simply "Finder™ user interface" hereafter) which runs on the Apple Macintosh™ computer. The Finder™ user interface is based on the aforedescribed display principles using "windows" and "icons" to help manage computer information. The main or root window is called the "desktop" area, or more generally the primary display region. The desk(op, or primary display region, is always open (displayed on the screen with its contents accessible or at least partially accessible), and takes up substantially the full display screen area when other windows are not open. The desktop is usually visible in the background when other windows are open.

Existing inside any particular window, including the desktop itself, are other information identifiers called "icons." An icon is a screen identifier associated with a particular collection of computer information. Typically an icon may represent a "file" which is either a collection of data or a program or program segment. An icon also may represent the dosed state of a window. Icons are graphic images displayed on the computer screen and usually correspond to the type of information stored within the file. Icons give the user access to the particular file represented by the graphic image when the icon is visible. The use of icons and windows is well known in the art.

The "file" is the information packet that the user wishes to utilize, create or modify; each particular file has an associated name identifying the file. Therefore, any given file may be located in the information management system by knowing a file name, an iconographic representation associated with the name, or a window locator name. All information (files) situated within a particular window are identified with that particular window's own identification location within the computer information management system. Therefore, any particular file information can be retrieved knowing its particular identification name and its window name. Accordingly, the resulting screen display utilizing the Finder™ user interface may be broken down into multiple windows and graphic icons.

Another important element of this (and other) conventional user interfaces is a screen cursor. The cursor allows direct user control over the user interface as described above. The Finder™ user interface is complemented with a "mouse" and a corresponding "pointer" which makes up the cursor control device. The user has control over the mouse, which is an electro-mechanical device that translates two-dimensional mouse movement into a two-dimensional screen position movement represented by, for example, a pointer or arrowhead. The user contacts and directs the mouse. When the mouse is moved freely on a table top, then the pointer on the screen will move in a similar and proportional manner. The mouse also contains one or more push buttons which can be used to effectuate control over the cursor pointer by selecting or deselecting specific icons or other display tools. It is said that the cursor pointer is "activated" when the mouse button is depressed and the pointer remains active until the button is released. Pointer activation may also be initiated by sequences of mouse button presses, such as a "double click" interaction which involves rapidly pressing the mouse button press twice in sequence.

Access to information in a conventional user interface system for a display management system is therefore based on windows, icons and pointer movement of the cursor. To access a file, the cursor pointer is placed on the visible icon or visible file name and the pointer is activated. A closed window may be represented by an icon or a window name. A window opens when the pointer of the cursor rests on the visible icon or visible name representing the closed state of the window and the pointer is activated. Within the open window, files may be displayed by icon or by name. An open window, of various geometries, may be rectangular and will exist within the display area of the main viewing screen on the desktop. Multiple windows may be open at one time, typically with the most foreground window corresponding to the most recently opened window and the background windows representing those opened previously. In the organization scheme described, it is appreciated that files are nested within windows and windows can be nested within other windows; the main or root window being the desktop area, or primary display region.

During a session using a window-based information system, many windows can be open at one time with many displayed icons within. Windows may overlap and partially, or entirely, hide other windows or icons. What results is that the particular information the user wants to obtain may be hidden behind several layers of windows and may be difficult to access; when an icon is hidden by another window it is temporarily not accessible. This has been referred to in the industry as the "window overlap" problem. There are several instances where window overlap problems routinely arise in the usage of conventional user interfaces. For the purposes of this particular invention, a window overlap problem of particular interest involves floating windows which provide feedback information to a user regarding a particular operation or application.

Those familiar with computers having graphical user interfaces will recognize the floating window as a useful, yet sometimes annoying phenomenon. Consider, for example, the floating window 10 illustrated in FIG. 1 which provides feedback for a speech recognition program. More specifically, the floating window 10 overlays existing windows, e.g., document window 14, to provide the user with feedback regarding whether a sound has been heard and whether an utterance has been recognized by the speech recognition program. However, the floating window 10 only provides useful information when the user is actively engaged in issuing speech commands and, therefore, only conveys relevant information to the user during relatively short intervals. Nonetheless, floating window 10 remains on the desktop as long as the speech recognition program is active, often obscuring documents or other underlying windows. When the floating window 10 obscures such underlying windows, the user can neither view nor interact with the contents thereof.

Thus, it can be seen that there remains a need in the art to design a GUI which permits a user to receive the useful information provided by floating windows while at the same time providing greater availability to the user of the underlying windows' content.

SUMMARY

According to exemplary embodiments of the present invention, these and other drawbacks and difficulties of conventional GUIs are overcome by providing such floating windows with varying visual and manipulative qualities. For example, a floating window that has not been updated with new information within a predetermined time period will become translucent so that the underlying window or windows are then visible to the user. Other actions or omissions may also serve as a trigger for graduated translucency of windows according to the present invention. Moreover, as the floating window becomes translucent, the user can click-through to the underlying window(s) to interact with its contents. When information on the floating window is updated, it can return to being opaque until the predetermined time period has elapsed again without new information being presented.

According to one exemplary embodiment of the present invention, the floating window may become translucent in steps. For example, the floating window may initially be displayed as completely opaque and then, after the predetermined time period expires, may have its opacity reduced in steps of, for example, twenty-five percent. The floating window can have a lower limit of translucency as well. Each of these parameters may be set by the application which generates the floating window or they may be set by the system or the user.

By applying graduated visual translucency, as well as manipulative translucency, a user is able to receive the benefits of an information-bearing floating window without having to move the floating window to reach underlying content. Moreover, the change in visual translucency provides a focus mechanism to the user who will readily associate a return to opacity with new information being presented on the floating window.

BRIEF DESCRIPTION OF THE DRAWINGS

These and other objects, features and advantages of the present invention will be readily understood by those skilled in the art by reading the following detailed description in conjunction with the drawings, in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 2:
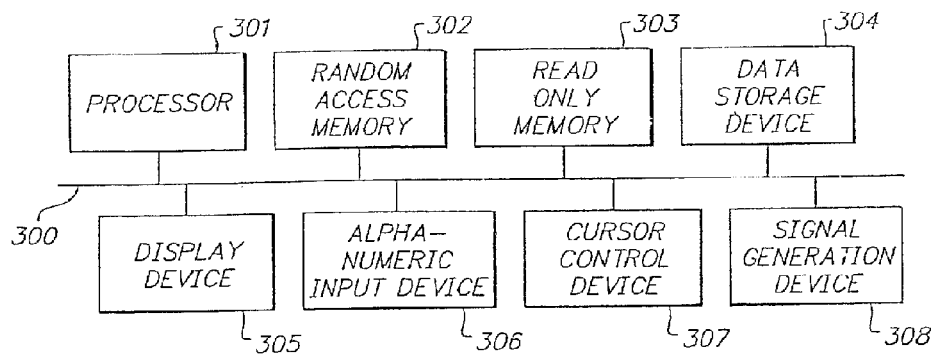
FIG. 2 is a block diagram of an exemplary system in which the present invention can be implemented.

Exemplary embodiments of the present invention can be implemented on an Apple Macintosh™ computer system using the Finder™ user interface. However, it will be readily appreciated by those skilled in the art that user interfaces and elements of user interfaces according to the present invention can be used in combination with any system having a processor and a display. In general, such computer systems, as illustrated in block diagram form by FIG. 2, comprise a bus 300 for communicating information, a processor 301 coupled with the bus for processing information and instructions, a random access memory 302 coupled with the bus 300 for storing information and instructions for the processor 301, a read only memory 303 coupled with the bus 300 for storing static information and instructions for the processor 301, a data storage device 304 such as a magnetic disk and disk drive or CD ROM drive coupled with the bus 300 for storing information and instructions, a display device 305 coupled to the bus 300 for displaying information to the computer user, an alphanumeric input device 306 including alphanumeric and function keys coupled to the bus 300 for communicating information and command selections to the processor 301, a cursor control device 307 coupled to the bus for communicating information and command selections to the processor 301, and a signal generating device 308 coupled to the bus 300 for communicating command selections to the processor 301.

The display device 305 utilized with the computer system and the present invention may be a liquid crystal device, cathode ray tube, or other display device suitable for creating images and alphanumeric characters (and ideographic character sets) recognizable to the user. The cursor control device 307 allows the computer user to dynamically signal the two dimensional movement of a visible symbol (cursor) on a display screen of the display device 305. Many implementations of the cursor control device are known in the art including a trackball, mouse, joystick or special keys on the alphanumeric input device 306 capable of signaling movement of a given direction or manner of displacement. It is to be appreciated that the cursor also may be directed and/or activated via input from the keyboard using special keys and key sequence commands. Alternatively, the cursor may be directed and/or activated via input from a number of specially adapted cursor directing devices, including those uniquely developed for the disabled. In the discussions regarding cursor movement and/or activation within the preferred embodiment, it is to be assumed that the input cursor directing device or push button may consist any of those described above and specifically is not limited to the mouse cursor device.

Figure 3:
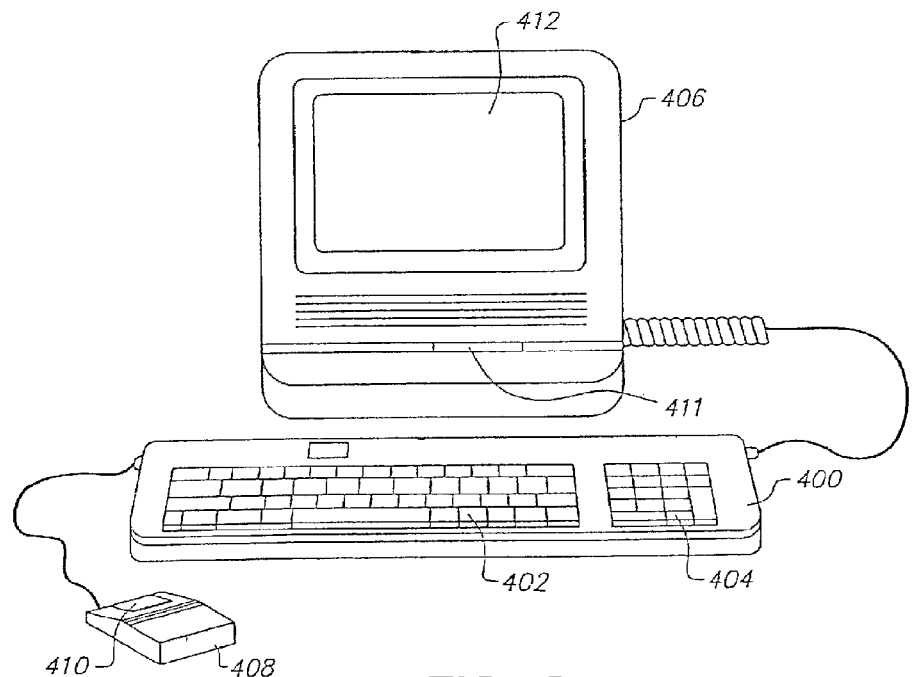
FIG. 3 is an exemplary computer system which may contain the functional blocks of FIG. 2 and in which the present invention can be implemented.

FIG. 3 illustrates an exemplary computer system that in which the present invention can be implemented. It will be appreciated that this computer system is one of many computer systems that may can include the present invention. Therein, a keyboard 400 with keys 402 and keypad 404 is attached to the computer 406 along with a mouse device 408 and mouse push button(s) 410 for controlling the cursor. The mouse device 408 and push button 410 make up a cursor control device 307. It will be appreciated that many other devices may be used as the cursor control device 307, for instance the keyboard 400 may be substituted for the mouse device 408 and button(s) 410 as just discussed above. The computer 406 also typically contains a one or more media drives 411 (e.g., floppy disk, hard disk or CD ROM) and a display screen 412.

Having described exemplary computer systems in which user interfaces according to the present invention can be implemented, the discussion now turns to a description of such user interfaces. According to exemplary embodiments of the present invention, the visual and manipulative characteristics of windows can be varied over time. Consider, for example, the information bearing window 500 illustrated in FIG. 4 in three different visual states. Initially, in panel A, the floating, information-bearing window 500 is completely opaque and contains certain information which can be easily read by the user.

Figure 7A:
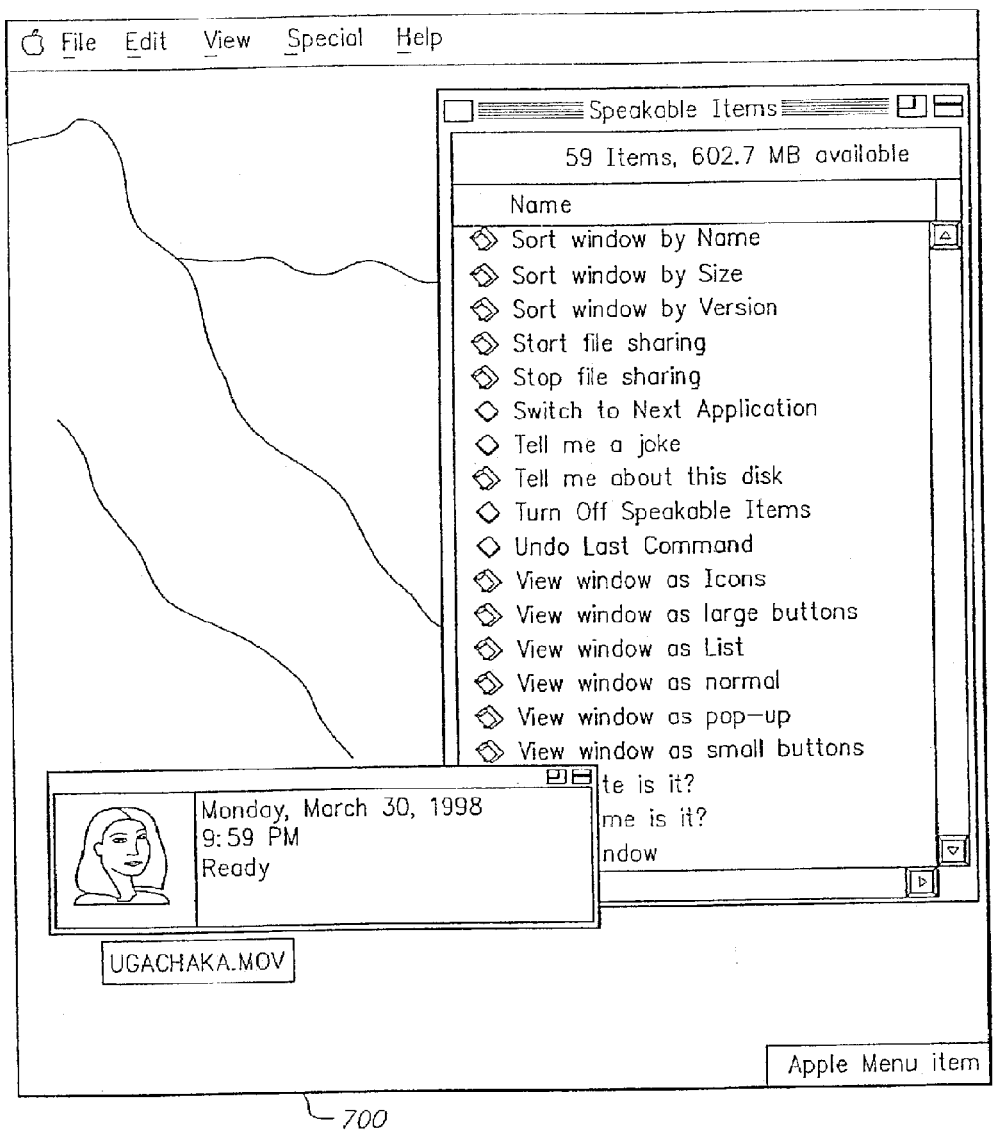
FIGS. 7(a)-7(d) depict graduated translucency according to an exemplary embodiment of the present invention.
Figure 7B:
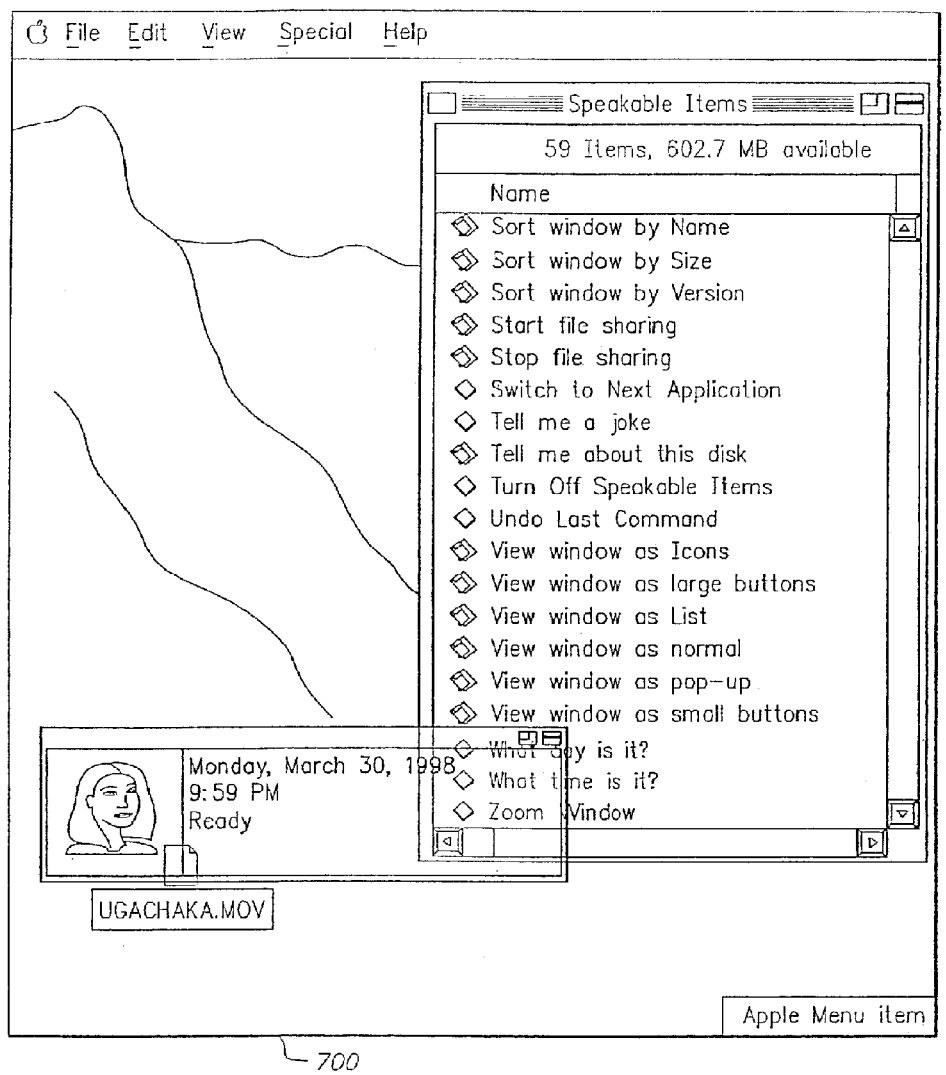
Figure 7C:
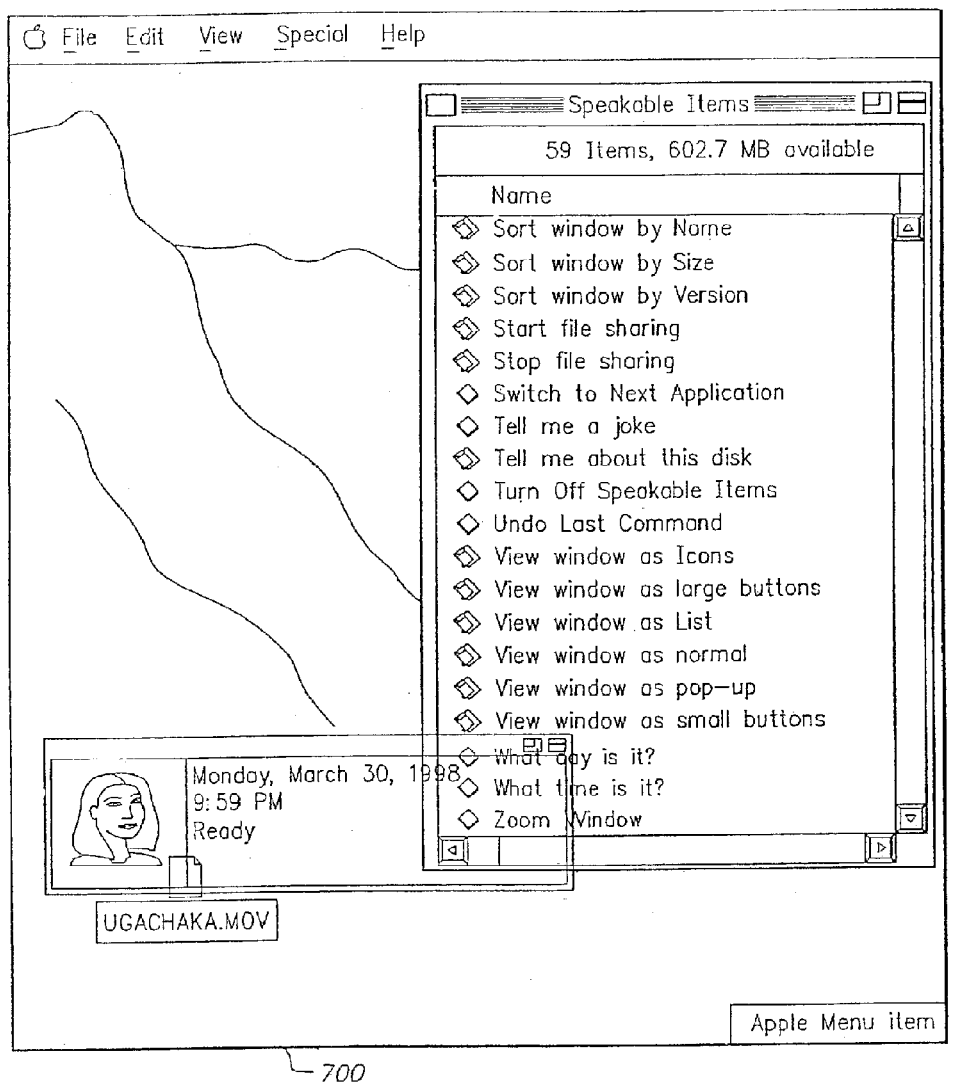
Figure 7D:
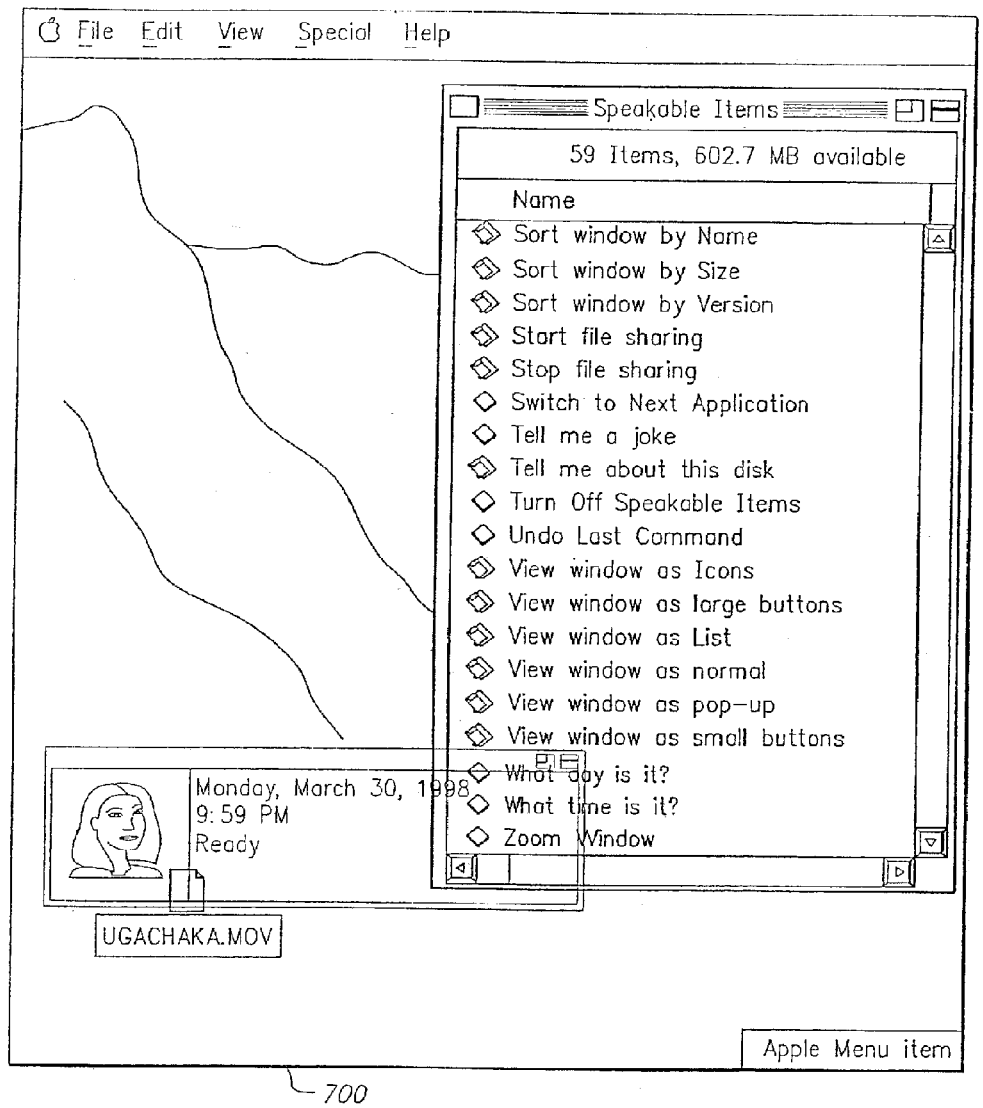

After some predetermined period of time has elapsed, e.g., 10 seconds, during which the information displayed in window 500 has not changed, the processor adds some degree of translucency to window 500 as seen in panel B. For example, the window 500 may become 20% translucent. At the point in time depicted in panel B, one can faintly make out the object 510 underlying the information-bearing window 500, which object 510 was completely obscured while window 500 was opaque in panel A. Next, after a second period of time (which may be the same as or different than the first period of time) during which the information in window 500 remains unchanged, the processor renders window 500 in a final translucent state as seen in panel C, wherein object 510 is even more readily visible, as well as the underlying window entitled "Speakable Items". For example, the window 500 may be rendered as 40% translucent. If information is changed in window 500 when the window 500 is displayed in the state of either panel B or panel C, then the window is returned to its completely opaque state. Another example of graduated translucency according to exemplary embodiments of the present invention is shown in FIGS. 7(a)-7(d). In FIG. 7(a), the window 700 has no translucency, i.e., is 100% opaque. Next, in FIG. 7(b), the same window 700 is displayed with 20% translucency (80% opaque). Likewise, FIGS. 7(c) and 7(d) portray window 700 with translucencies of 40% and 60%, respectively.

Thus, FIGS. 4 and 7(a)-7(d) exemplify the manner in which the present invention provides graduated visual translucency to a window in a graphical user interface. Those skilled in the art will appreciate that although the foregoing example illustrates an embodiment having one step of translucency for window 500 between an opaque state and a translucent state, any number of steps, e.g., one or three or more can be provided. Moreover, the time period between steps can also be set to any desired value or values. For example, the time period between the completely opaque state depicted in FIG. 7(a) and the 20% translucent state of FIG. 7(b) may be 5 seconds, the time period between the 20% translucent state of FIG. 7(b) and the 40% translucent state of FIG. 7(c) may be 3 seconds and the time period between the 40% translucent state of FIG. 7(c) and the 60% translucent state of FIG. 7(d) may be 2 seconds.

The visual translucency of windows according to the present invention can be generated according to any known method including, as will be appreciated by those skilled in the art, blending the pixels associated with window 500 together with pixels from the underlying window using an algorithm which provides an appearance of translucency. Specific details of such algorithms are beyond the scope of this discussion, however the interested reader is directed to U.S. Pat. No. 5,949,432, entitled "Method and Apparatus for Providing Translucent Images on a Computer Display", assigned to Apple Computer, Inc., the disclosure of which is expressly incorporated herein by reference, for further details of one exemplary technique for creating such a translucent effect. In using such blending techniques, a variable degree of translucency (or alternatively opacity) can be obtained, e.g., by varying a ratio of pixels taken from the overlaid window 500 relative to pixels taken from the underlying objects or background. For example, by making the ratio of pixels selected from window 500 relative to pixels selected from the underlying window in panel B of FIG. 4 greater than the same ratio used by the processor 301 to render panel C in FIG. 4, a lesser degree of translucency is provided for window 500 in panel B as compared with panel C. Such a ratio can be expressed as a percentage as mentioned above, e.g., window 500 in panel B is 20% translucent whereas window 500 in panel C is 40% translucent.

Figure 1:
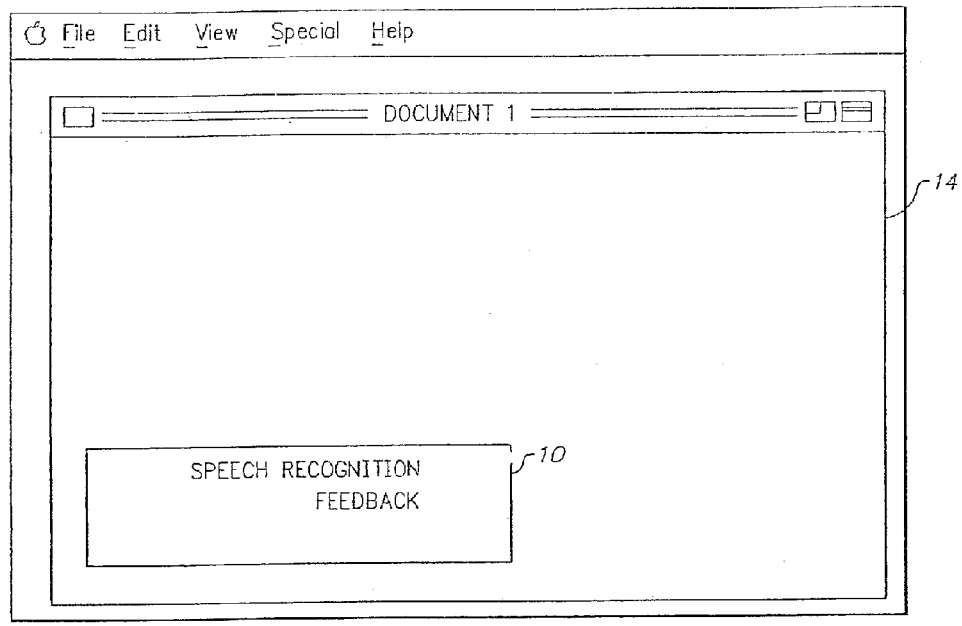
FIG. 1 depicts a conventional user interface including a floating window overlaying a document window.
Figure 5:
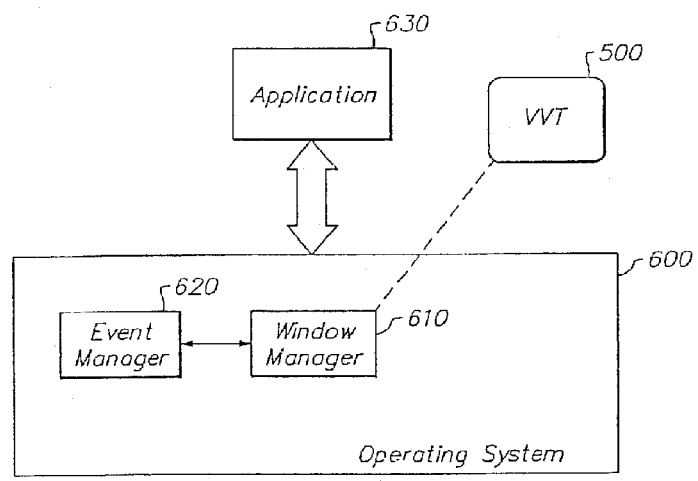
FIG. 5 illustrates interactions between an operating system and an application to create variable visual and manipulative windows according to an exemplary embodiment of the present invention.

The parameters mentioned above that are associated with the generation of graduated, visual translucency according to the present invention can be provided to the processor by an application which is associated with the window 500. For example, if a speech recognition program indicates that an information-bearing, floating window is to be created on the graphical user interface to provide the user with feedback regarding the status of the speech recognition program, the application can pass values for these parameters to an appropriate functional layer of the computer operating system as shown in FIG. 5. Therein, an operating system 600 includes, among other functional elements not shown here, a window manager 610 and an event manager 620. The window manager 610 includes a definition of a window having variable visual translucency (a VVT window), which definition identifies the particular parameters to be passed such that the window manager 610 can create the window 500 on the graphical user interface. For example, the window manager 610 may include a VVT definition which includes the following elements:

VVT WindowDef

[Region]—specifying the region of the desktop in which to render the window;

[Initial translucency]—specifying the translucency percentage of the initial state (subsequent to the opaque state) of the VVT window;

[Final translucency]—specifying the translucency percentage of the final state for the VVT;

[Decay]—rate at which window becomes more translucent between initial and final translucency states, e.g., 10% every five seconds without changes to the displayed information;

[First time period]—time after which opaque window enters initial state if information displayed therein remains unchanged;

[Manipulative translucency]—translucency at which input in window region operates on underlying object(s).

To create a VVT window using this exemplary definition, application 630 makes a call for a new VVT window to the window manager 610, including a specification of the parameters set forth in the VVTWindowDef, e.g., VVT (Region, 20%, 60%, 10%/5 seconds, 10 seconds). The window manager 610 would then render the \VVT window in the designated region with the desired variable translucent properties. Once again, those skilled in the art will appreciate that the above-described window definition is simply illustrative and that other definitions having different parameters can be used to achieve the same or similar effects. Moreover, other parameters can be added to the VVT window definition. For example, a transition effect can be added which lets the user know that the window 500 is beginning to fade or when the window becomes opaque once again, e.g., a brief flash or sound effect, so that the user is informed that the information being displayed in the window 500 has not changed recently or has just been updated, respectively.

Figure 4:
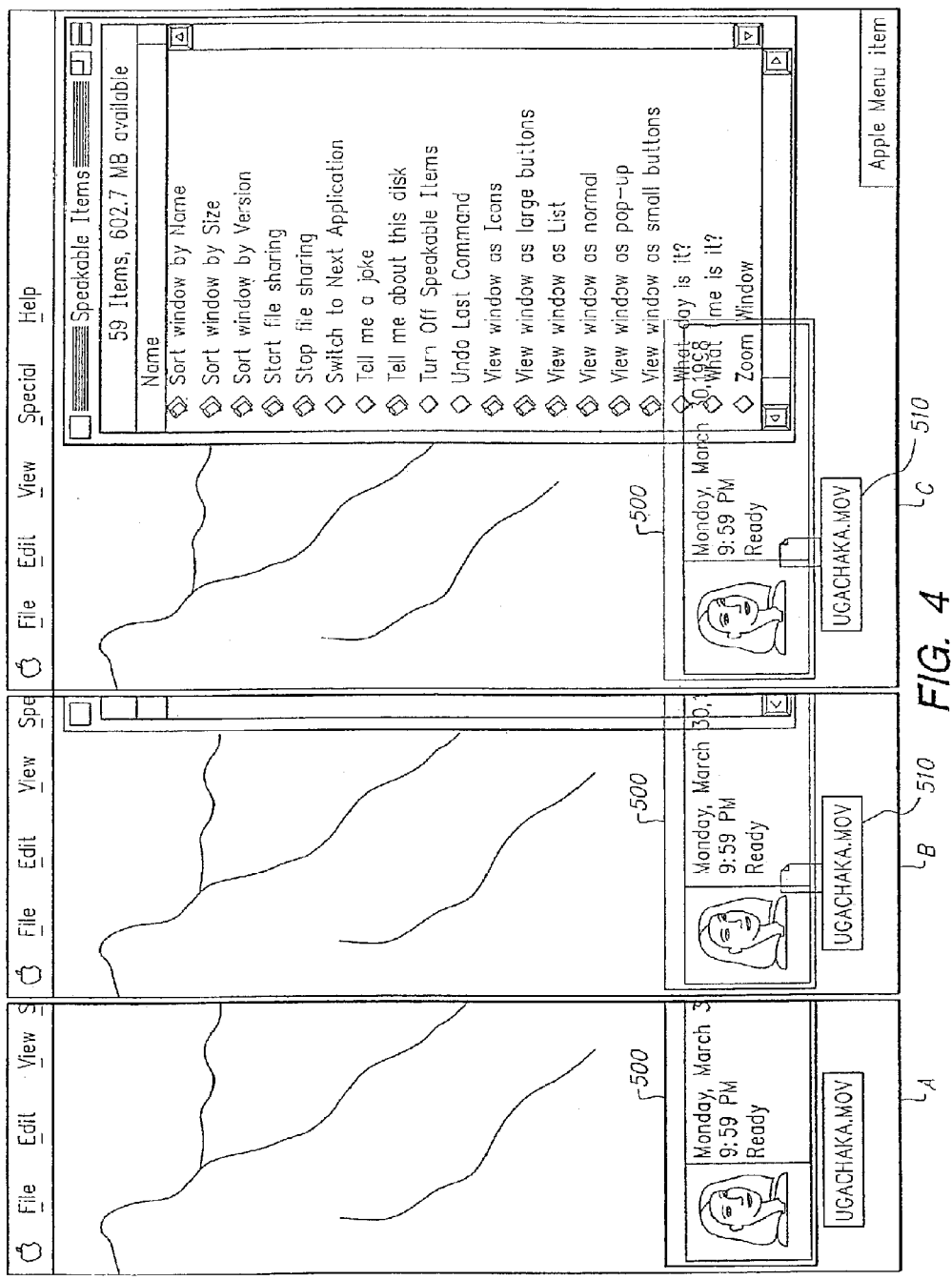
FIG. 4 illustrates various levels of translucency of a window according to an exemplary embodiment of the present invention.

According to further exemplary embodiments of the present invention, manipulative transparency can also be provided to window 500. For example, when the window 500 reaches a certain visual translucency, e.g., a percentage specified by the application 630 in the window call (or specified by the user or operating system), then cursor operations or other user input are interpreted by the event manager 620 as operations on the underlying window or objects rather than an operation on the contents of window 500. To illustrate this point, suppose that the application 630 called for a window 500 as seen in FIG. 4 wherein the initial translucent state and the manipulative translucency point corresponded to one another. Then, when the window 500 was displayed as shown in panel B, positioning the cursor (not shown) over the faintly visible object 510 under window 500 and "double-clicking", would be interpreted by the event manager 620 as an operation on the underlying object 510 instead of an operation on the contents of window 500. By providing manipulative as well as visual transparency, the present invention is able to provide the user with the useful feedback information conveyed by window 500, while also allowing the user to easily view and work with underlying objects when the information in window 500 is not rapidly changing.

Figure 6:
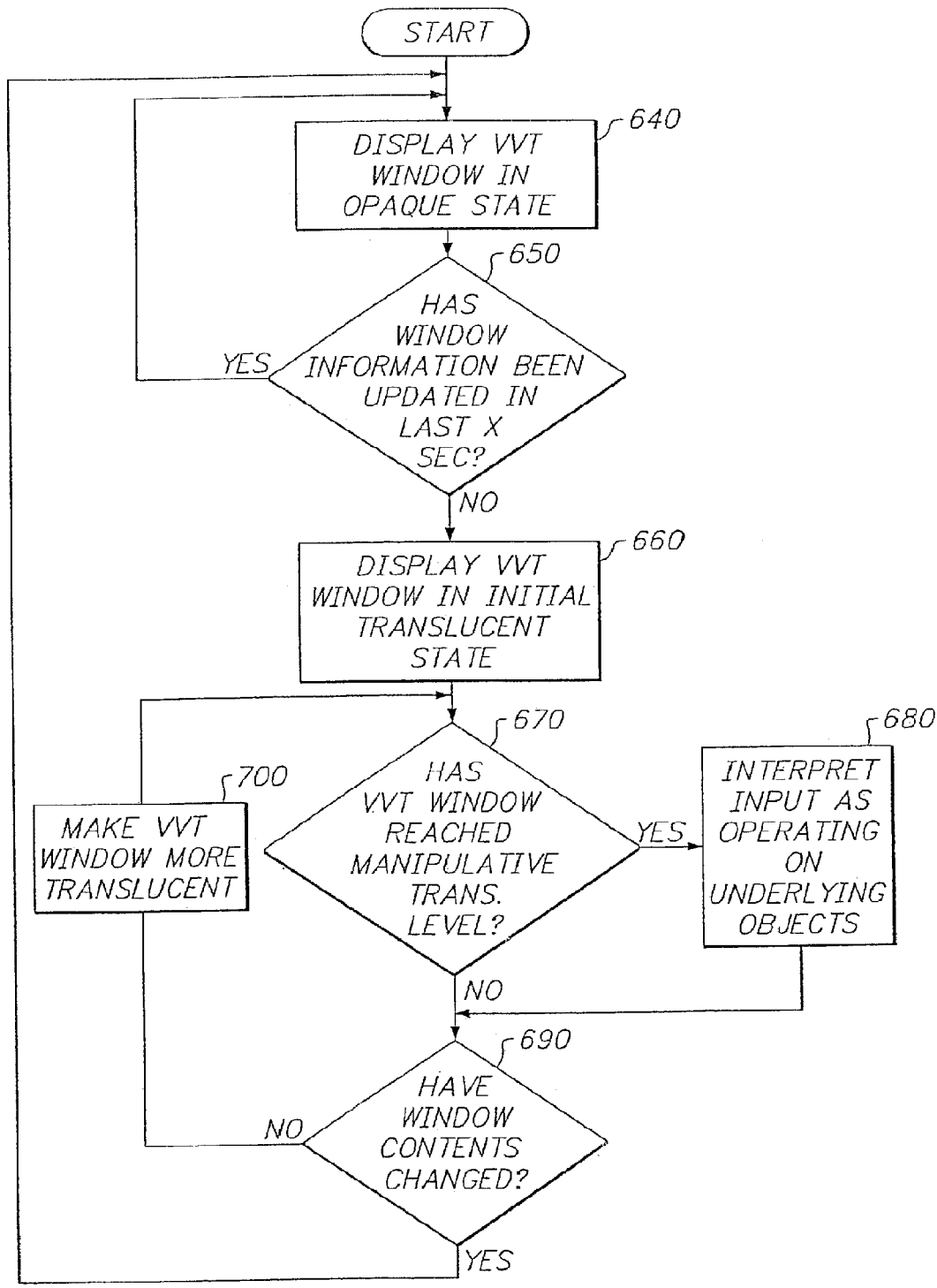
FIG. 6 is a flowchart illustrating exemplary methods according to the present invention.

Thus methods according to the present invention are exemplified by the flow chart of FIG. 6. Therein, at step 640, a VVT window is displayed in its opaque state. If the window's information or other contents have not changed within a predetermined update interval, at step 650, then the window is rendered in its initial translucent state at step 660. Otherwise, if the window's contents have changed, then the window remains in its opaque state. Of course, if the application 630 has only requested a VVT window with a single translucent state, then this may also be the final translucent state. Next, at step 670, it is determined whether the window 500 has reached the manipulative level of translucency. If so, then the flow proceeds to step 680 wherein user input is interpreted as operating on the underlying window or object(s). Otherwise, the flow continues to step 690 where it is again determined (after some predetermined delay) whether the window's contents have changed. If so, then the window becomes opaque again. If not, then the process moves to block 700 wherein the window is made more translucent according to the parameters supplied in the call used to create the window.

The above-described exemplary embodiments are intended to be illustrative in all respects, rather than restrictive, of the present invention. Thus the present invention is capable of many variations in detailed implementation that can be derived from the description contained herein by a person skilled in the art. For example, the foregoing exemplary embodiments describe an application of the present invention wherein graduated translucency is triggered when information displayed in a window is unchanged for a predetermined period of time. However other triggering events (lack of events) may be used to invoke graduated translucency as described herein. For example, lack of user input, e.g., via keyboard, cursor or voice, may result in a window or other object becoming translucent as described above.

Moreover, although the foregoing exemplary embodiments relate to the provision of graduated translucency in the direction of from opaque to translucent, those skilled in the art will appreciate that the graduated change in visual output can also be applied from translucent to opaque. For example, when an input is received for a window that has reached some degree of translucency, that window may transition back to complete (or substantially complete) opacity in one or more steps. All such variations and modifications are considered to be within the scope and spirit of the present invention as defined by the following claims.

What is claimed is:

1. A method comprising:
at a computing device with one or more processors:
displaying in a graphical user interface generated by the one or more processors, a window in a first translucent state, the window presenting information;
while displaying the window in the first translucent state, detecting a predetermined event corresponding to the window; and
in response to detecting the predetermined event, gradually transitioning the window from the first translucent state to an opaque state.

2. The method of claim 1, wherein detecting the predetermined event includes detecting a change in the presented information.

3. The method of claim 1, wherein detecting the predetermined event includes detecting a user input directed at the window.

4. The method of claim 1, further comprising, receiving, from a user on the computing device, an input indicating a first translucency level for the first translucent state.

5. The method of claim 1, further comprising, receiving, from an application executing on the computing device, a first translucency level for the first translucent state.

6. The method of claim 1, further comprising, rendering, in response to a specified event, the specified event differing from the predetermined event, the window in a second translucent state after rendering the window in the first translucent state and before rendering the window in the opaque state, wherein the second translucent state is less translucent than the first translucent state.

7. The method of claim 1, wherein rendering, in response to detecting the predetermined event, the window in an opaque state includes:
rendering, in response to detecting the predetermined event, the window in a second translucent state for a specified duration, wherein the second translucent state is less translucent than the first translucent state; and
rendering the window in an opaque state after expiration of the specified duration.

8. The method of claim 1, further comprising, after rendering the window in the opaque state, rendering the window in the first translucent state in response to detecting passage of a first predetermined length of time during which no user input directed toward the window was received or the presented information did not change.

9. The method of claim 8, further comprising, in response to detecting passage of the first predetermined length of time and before rendering the window in the first translucent state in response to detecting passage of the first predetermined length of time, flashing a light or playing a sound.

10. The method of claim 8, further comprising, rendering the window in a second translucent state in response to detecting passage of a second predetermined length of time during which no user input directed toward the window was received or the presented information did not change.

11. The method of claim 10, wherein the first predetermined length of time and the second predetermined length of time have different durations.

12. The method of claim 1, further comprising, after rendering the window in the opaque state, rendering the window in a second translucent state in response to detecting passage of a second predetermined length of time during which no user input directed toward the window was received or the presented information did not change, wherein the second translucent state is more translucent than the first translucent state.

13. The method of claim 1, further comprising, in response to detecting the predetermined event and before rendering the window in the opaque state, flashing a light or playing a sound.

14. A non-transitory machine-readable medium including instructions for receiving information, which when executed by a machine, cause the machine to:
display in a graphical user interface generated by a computing device, a window in a first translucent state, the window presenting information;
while displaying the window in the first translucent state, detect a predetermined event corresponding to the window; and
in response to the detected event, gradually transition the window from the first translucent state to an opaque state.

15. The non-transitory machine-readable medium of claim 14, wherein operations to detect the predetermined event include operations to detect a change in the presented information.

16. The non-transitory machine-readable medium of claim 14, wherein operations to detect the predetermined event include operations to detect a user input directed at the window.

17. The non-transitory machine-readable medium of claim 14, further comprising, operations to receive, from a user on the computing device or an application executing on the computing device, an input indicating a first translucency level for the first translucent state.

18. The non-transitory machine-readable medium of claim 14, further comprising, operations to render the window in a second translucent state between operations to render the window in the first translucent state and operations to render the window in the opaque state, wherein the second translucent state is less translucent than the first translucent state.

19. A system comprising:
a display device configured to display a graphical user interface including a window presenting information;
one or more processors coupled to a memory device, the memory device containing instructions that, when executed by the one or more processors, cause the system to:
display in the graphical user interface, the window in a first translucent state;
while displaying the window in the first translucent state, detect a predetermined event corresponding to the window; and
in response to the detected event, gradually transition the window from the first translucent state to an opaque state.

20. The system of claim 19, wherein the predetermined event includes a change in the presented information or a user input directed at the window.

* * * * *